United States Patent
Berheide et al.

(10) Patent No.: US 9,803,378 B2
(45) Date of Patent: Oct. 31, 2017

(54) OVERLAYMENT

(71) Applicants: Kent Berheide, VanWert, OH (US); Sara Berheide, VanWert, OH (US)

(72) Inventors: Kent Berheide, VanWert, OH (US); Sara Berheide, VanWert, OH (US)

( * ) Notice: Subject to any disclaimer, the term of this patent is extended or adjusted under 35 U.S.C. 154(b) by 0 days.

(21) Appl. No.: 15/082,285

(22) Filed: Mar. 28, 2016

(65) Prior Publication Data
US 2016/0281373 A1    Sep. 29, 2016

Related U.S. Application Data

(60) Provisional application No. 62/139,202, filed on Mar. 27, 2015.

(51) Int. Cl.
| | | |
|---|---|---|
| *E04F 15/02* | (2006.01) | |
| *E04F 15/16* | (2006.01) | |
| *C09J 7/02* | (2006.01) | |
| *E04F 15/20* | (2006.01) | |

(52) U.S. Cl.
CPC ........... *E04F 15/16* (2013.01); *C09J 7/0289* (2013.01); *E04F 15/02155* (2013.01); *E04F 15/203* (2013.01); *C09J 2201/622* (2013.01)

(58) Field of Classification Search
CPC ......... E04F 15/16; E04F 15/18; E04F 15/203; E04F 15/22; E04F 15/107; E04F 15/02155; Y10T 428/14; Y10T 428/149; Y10T 428/249921; Y10T 428/249953–428/249961; Y10T 428/249976; Y10T 428/249982–428/249859; B32B 7/12; B32B 7/18; B32B 3/265; C09J 7/02
See application file for complete search history.

(56) References Cited

U.S. PATENT DOCUMENTS

| | | | | |
|---|---|---|---|---|
| 4,237,178 A | * | 12/1980 | Mazaki | B32B 15/14 181/290 |
| 2007/0104942 A1 | * | 5/2007 | Lewin | C09J 7/0246 428/317.3 |
| 2009/0194147 A1 | * | 8/2009 | Grommesh | B32B 37/1018 136/251 |
| 2011/0159225 A1 | * | 6/2011 | Boyle | C09J 7/0225 428/41.8 |
| 2013/0086869 A1 | * | 4/2013 | Couturier | E04F 13/0887 52/746.1 |
| 2013/0171407 A1 | * | 7/2013 | Franzoi | F02C 7/045 428/116 |
| 2013/0177726 A1 | * | 7/2013 | Erasmus | B32B 5/022 428/41.8 |
| 2013/0196106 A1 | | 8/2013 | Erasmus | |

(Continued)

FOREIGN PATENT DOCUMENTS

CA    2339424 A1 *    9/2001   ......... A47G 27/0468

*Primary Examiner* — Beth Stephan
(74) *Attorney, Agent, or Firm* — Taylor IP, P.C.

(57) ABSTRACT

A flooring system including a finished flooring layer and an overlayment to which the finished flooring layer is coupled. The overlayment has a closed cell foam layer, an adhesive layer applied to a side of the closed cell foam layer, and a peelable layer removably positioned on the adhesive layer. The adhesive layer having a positive coefficient sheer adhesion to the finished flooring layer over a period exceeding three weeks from application of the finished flooring layer to the adhesive layer.

8 Claims, 3 Drawing Sheets

(56) References Cited

U.S. PATENT DOCUMENTS

2014/0190616 A1* 7/2014 Archbold ............... C09J 7/0289
156/71
2015/0079325 A1* 3/2015 Erasmus ................ C09J 7/0246
428/40.2

* cited by examiner

OVERLAYMENT

CROSS REFERENCE TO RELATED APPLICATIONS

This is a non-provisional patent application based on U.S. Provisional Application Ser. No. 62/139,202, entitled "OVERLAYMENT", filed Mar. 27, 2015, which is incorporated herein by reference.

BACKGROUND OF THE INVENTION

1. Field of the Invention

The present invention relates generally to a cushioned layer that is generally applied to a floor, but can also be used on roofs or walls.

2. Description of the Related Art

A foam rubber, often referred to as cellular, sponge, or expanded rubber refers to rubber that has been manufactured with a foaming agent to create an air-filled matrix construct. Foam rubber is generally made of either polyurethane or natural latex. The main physical properties of foam rubber are lightweight, buoyant, cushioning performance, thermal and acoustic insulation, and impact dampening. Crosslinking technology is used in the formation of EVA based foams, including LLDPE, LDPE, HDPE, PP, and TPE. Crosslinking is the most important characteristic in the production of foam rubber to obtain the best possible foam expansion and physical properties. Crosslinking is defined as chemical bonding between polymer chains, and is used for foam rubber manufacturing to stabilize bubble expansion, enhanced resistance to thermal collapse and improve physical properties.

Surface coverings, particularly decorative finished flooring products, often require an underlayment to be installed over an underlying support surface, such as a wood sub-floor, concrete or other substrate. Often the underlayment layer is attached to the substrate by way of an adhesive, nails, screws, or staples. The underlayment serves as a foundation for the application of the surface coverings, and provides a clean, smooth surface upon which to position a finished floor or other surface layer. A function of the underlayment is to provide a smooth surface so that the texture or graining of the underlying surface is not transmitted through to the surface of the top layer of the flooring. Unfortunately some underlayments fail to resist loads and punctures from concentrated loads and traffic, and can contain substances that bleed through and stain the surface covering.

One manner of installing an underlayment is to use a liquid adhesive applied to the exposed surface of the underlayment, and/or to the flooring surface and then applying the underlayment and the flooring to each other. Typically, the adhesives is applied at the floor with the use of a notched trowel to spread the adhesive on the floor, which can prove to be labor intensive and often a messy process. Roll-on and spray-on adhesives are also available. The adhesives should firmly bond the surface covering to the underlayment to prevent the surface covering from buckling or curling through a wide range of wear and environmental conditions. Importantly, the adhesive should not contribute to staining of the finished flooring.

Another manner of installing underlayment is to provide an adhesive layer on the back of the surface covering itself. Pre-applied adhesives primarily have been utilized for carpet installation. For example, one installation method includes a thin scrim webbing with adhesive on both sides and a release film disposed over the adhesive on one side. Another similar method uses a carpet padding which has a pressure sensitive adhesive on both sides and a release film disposed over the adhesive on one side. The exposed adhesive is contacted with the sub-floor, and the release film is removed to expose an adhesive layer, which receives and bonds to the carpet.

A difficulty with underlayment is that the adhesive is messy and does not allow easy adjustment of the floor being applied thereover.

What is needed in the art is an overlayment that allows for adjustment of flooring pieces as it is being laid, yet increased in strength allowing an efficient cost saving installation.

SUMMARY OF THE INVENTION

The present invention provides an inventive overlayment with an increasing shear adhesion characteristic.

The invention in one form is directed to a flooring system including a finished flooring layer and an overlayment to which the finished flooring layer is coupled. The overlayment has a closed cell foam layer, an adhesive layer applied to a side of the closed cell foam layer, and a peelable layer removably positioned on the adhesive layer. The adhesive layer having a positive coefficient sheer adhesion to the finished flooring layer over a period exceeding three weeks from application of the finished flooring layer to the adhesive layer.

The invention in another form is directed to an overlayment to which a finished flooring layer is coupled. The overlayment has a closed cell foam layer, an adhesive layer applied to a side of the closed cell foam layer, and a peelable layer removably positioned on the adhesive layer. The adhesive layer having a positive coefficient sheer adhesion to the finished flooring layer over a period exceeding three weeks from application of the finished flooring layer to the adhesive layer.

An advantage of the present invention is that the adhesive allows for easy adjustment of the finish flooring pieces, yet increases in its adhesion over time.

Another advantage is that the present invention is that the increase in adhesion continues after prior art systems decline in adhesion.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
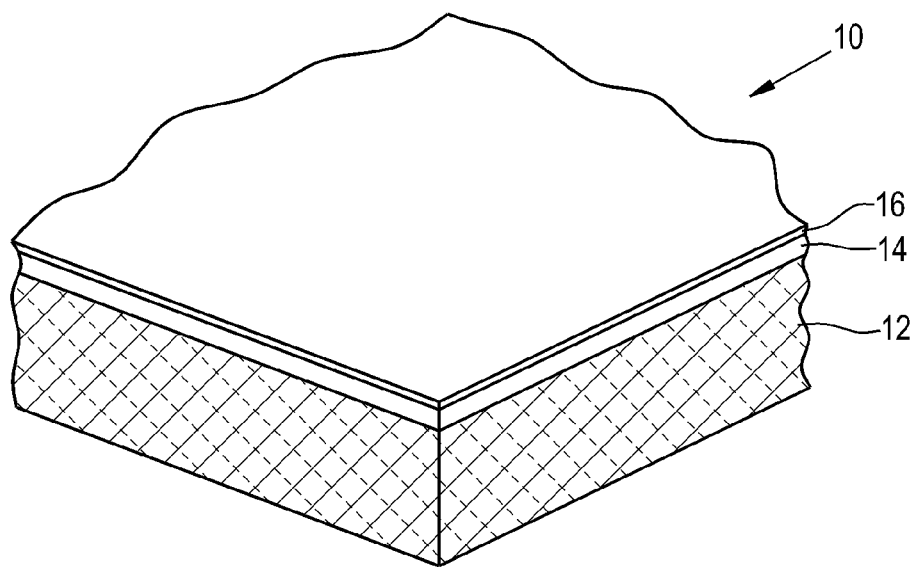
FIG. 1 is a side perspective view of an embodiment the overlayment of the present invention.

Referring now to the drawings, and more particularly to FIG. 1, there is shown a view of an embodiment of an overlayment 10 of the present invention. While the terms "underlayment" and "overlayment" may be a term of preference, the term used herein is overlayment to represent that it is laid over a floor and becomes part of the new flooring system laid over the old floor.

Figure 2:
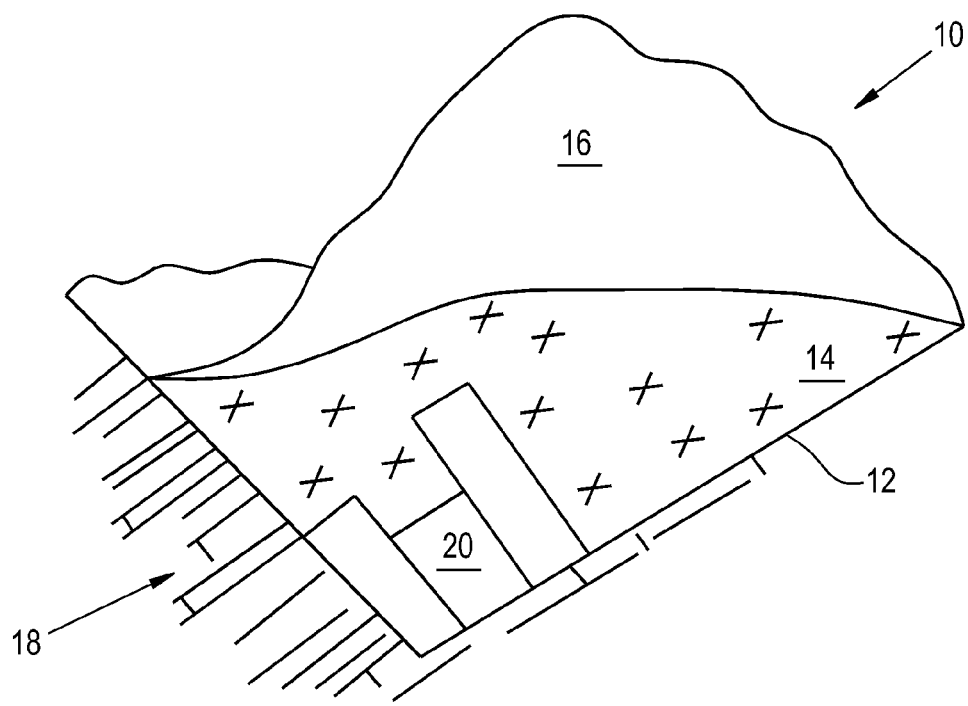
FIG. 2 is another view of the overlayment of FIG. 1 being applied to a sub-floor with new flooring being installed on the overlayment.

Overlayment 10 has a substrate layer 12, an adhesive layer 14, and a peelable layer 16. As can be seen in FIG. 2, overlayment 10 is placed on a legacy floor 18, and peelable layer 16 is peeled back and a new floor 20 is positioned on adhesive layer 14.

Layer 12 of the present invention is made of a high density (referred to as 24.5 HD) foam that is a closed cell foam that is in the form of ground material that is mixed with an adhesive to form cylindrical logs. The material may have an approximate composition of 80% ground HD foam and 20% adhesive, which is baked at an elevated temperature, such as 475 degrees F., for a predetermined time, such as 6 hours. The formed logs are then veneered using a cutting device, such as a band saw into the desired thickness.

Adhesive layer 14 is applied to a surface of layer 12 and layer 16 is applied for the ease of handling of overlayment 10. An advantage of the present invention is that unlike other similar products the present invention is non-leaching onto the applied flooring material. Another advantage is that the present invention allows for superior adhesion, yet allows easy shifting and removal of the flooring pieces during the installation process.

Figure 3:
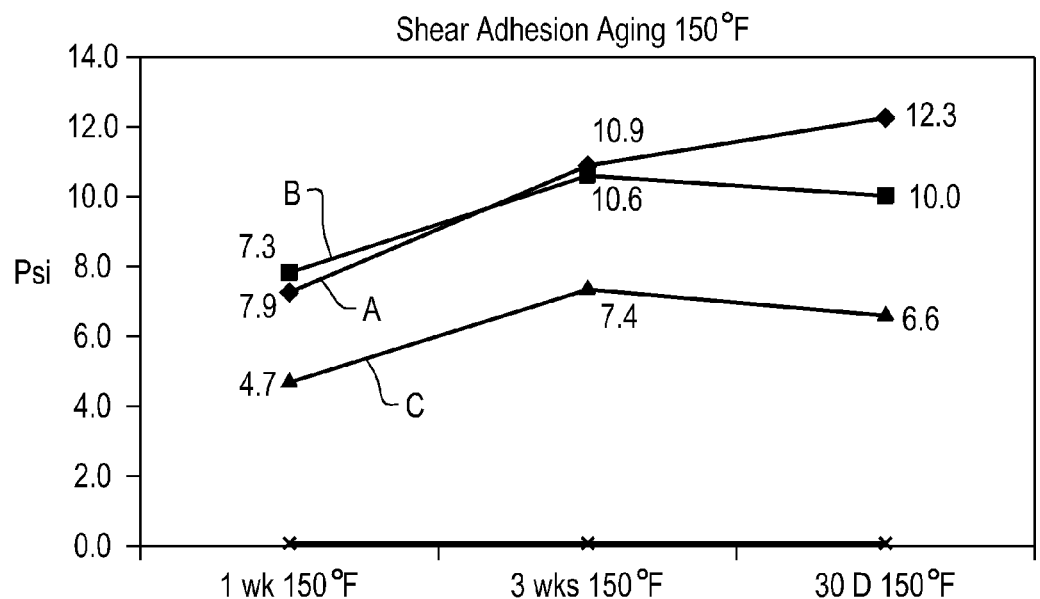
FIG. 3 is a plot of sheer adhesion of the adhesive of the overlayment of FIGS. 1 and 2 at an elevated temperature.
Figure 4:
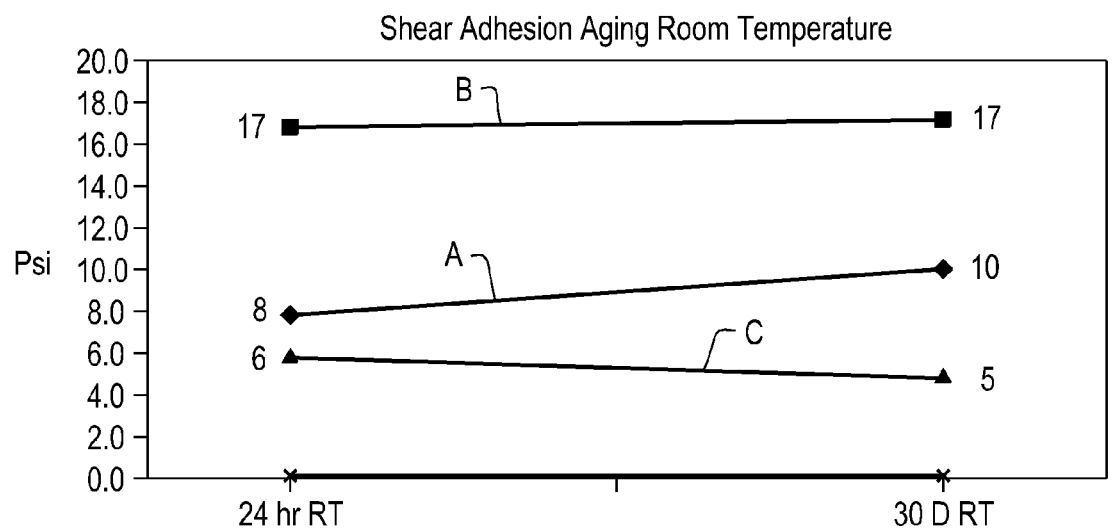
FIG. 4 is a plot of sheer adhesion of the adhesive of the overlayment of FIGS. 1 and 2 at a non-elevated room temperature.

As can be seen in FIGS. 3 and 4 there is a positive coefficient of sheer adhesion of unit A, which is the results of the present invention, over all measured time periods, where the prior art samples B and C are static or decline over at least a portion of the selected time ranges. FIG. 3 illustrates the shear adhesion strength when aged at 150° F. at one week, three weeks and 30 days. FIG. 4 illustrates the results over a 24 hour to 30 day time period at room temperature. Generally elevated temperature testing is an accelerated testing of what can be expected at room temperature over an even longer period of time. The results of unit A show an always positive growth (positive coefficient) in the shear adhesion test. While it is recognized that this cannot continue forever, the present invention has a positive coefficient of shear adhesion even over the accelerated aging at 150° testing, while the prior art does not.

Figure 5:
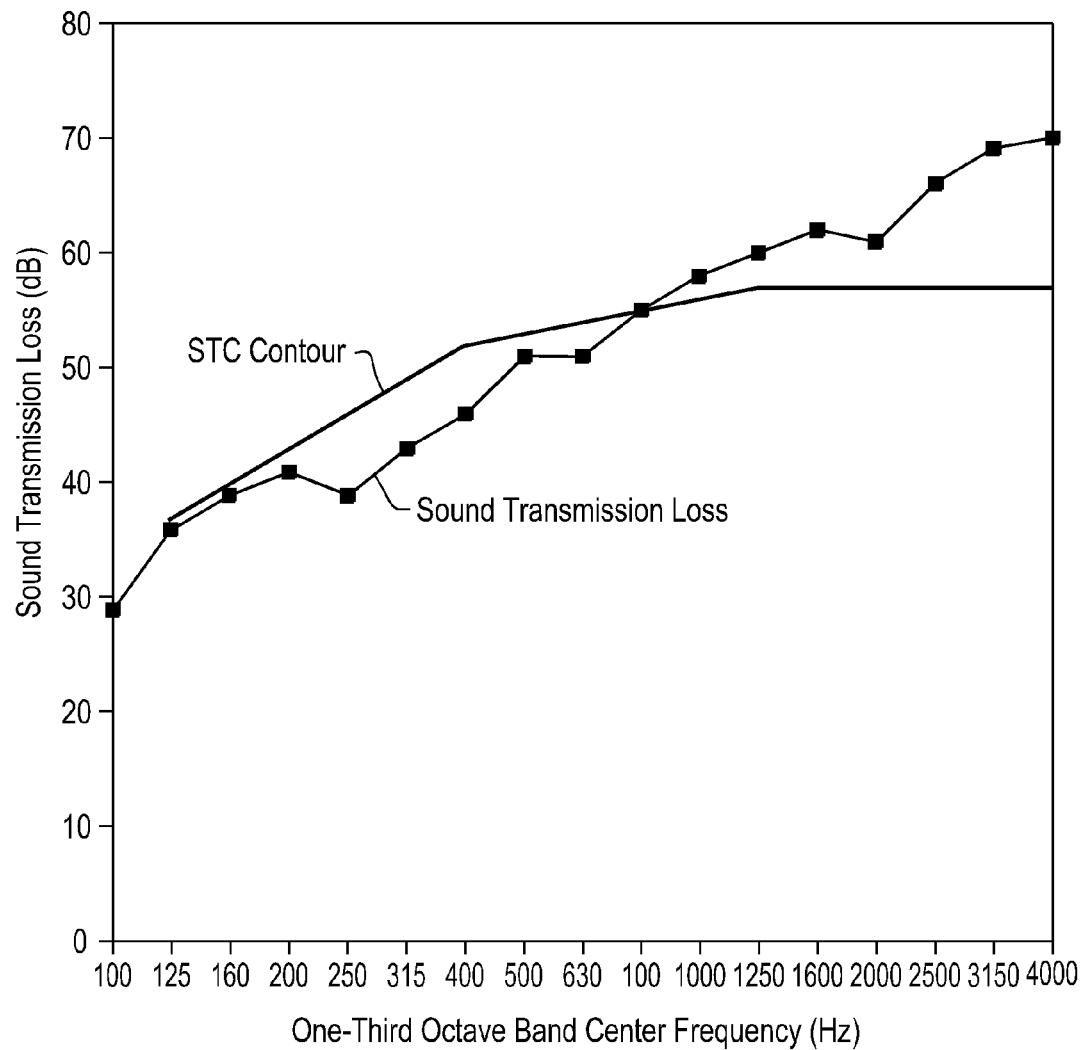
FIG. 5 is a plot of the sound deadening capability of the overlayment of FIGS. 1 and 2.

Now, additionally referring to FIG. 5 there is shown the results of testing the sound deadening capability of the present invention over a frequency range of 100 to 4,000 Hz, which is a significant portion of the audible hearing range. The sound loss at 100 Hz is approximately 30 dB and the loss generally increases over the frequency range to approximately 70 dB at 4,000 Hz.

Advantageously the present invention has an adhesive property that allows a floor 20 to be installed that can be shifted or removed with reduced force to correct any installation problems, similar to unit C early on (see particularly FIG. 4), yet increases as it ages over at least the 30 day timeframe and likely longer looking at the accelerated aging test of the 150° F. testing (in FIG. 3), so that the shear adhesion will exceed the unit B result over time.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An overlayment for application of a covering layer thereover, comprising:
   a closed cell foam layer;
   an adhesive layer applied to a side of the closed cell foam layer; and
   a peelable layer removably positioned on the adhesive layer, the adhesive layer having a positive coefficient sheer adhesion to the covering layer over a period exceeding three weeks after the peelable layer is removed, the positive coefficient sheer adhesion being at an elevated temperature of 150 degrees Fahrenheit, wherein the positive coefficient sheer adhesion at the elevated temperature of 150 degrees Fahrenheit is higher than if the overlayment was not at the elevated temperature.

2. The overlayment of claim 1, wherein the period is at least 30 days.

3. The overlayment of claim 1, wherein the closed cell foam layer has a sound transmission loss coefficient that is generally positive over the range of 100 Hz to 4,000 Hz.

4. The overlayment of claim 3, wherein the closed cell foam layer has a sound transmission loss that ranges from approximately 30 dB at 100 Hz to approximately 70 dB at 4,000 Hz.

5. A flooring system, comprising:
   a finished flooring layer; and
   an overlayment to which the finished flooring layer is coupled, the overlayment including:
   a closed cell foam layer;
   an adhesive layer applied to a side of the closed cell foam layer; and
   a peelable layer removably positioned on the adhesive layer, the adhesive layer having a positive coefficient sheer adhesion to the finished flooring layer over a period exceeding three weeks from application of the finished flooring layer to the adhesive layer, the positive coefficient sheer adhesion being determined at an elevated temperature of 150 degrees Fahrenheit which is higher than if the overlayment was not at the elevated temperature.

6. The flooring system of claim 5, wherein the period is at least 30 days.

7. The flooring system of claim 5, wherein the closed cell foam layer has a sound transmission loss coefficient that is generally positive over the range of 100 Hz to 4,000 Hz.

8. The flooring system of claim 7, wherein the closed cell foam layer has a sound transmission loss that ranges from approximately 30 dB at 100 Hz to approximately 70 dB at 4,000 Hz.

* * * * *